United States Patent [19]

Kondo

[11] Patent Number: 4,721,338
[45] Date of Patent: Jan. 26, 1988

[54] ARRESTING DEVICE FOR REAR SEAT BACK

[75] Inventor: Nobuaki Kondo, Fujisawa, Japan

[73] Assignee: Nissan Motor Co., Ltd., Yokohama, Japan

[21] Appl. No.: 844,599

[22] Filed: Mar. 27, 1986

[30] Foreign Application Priority Data

Apr. 3, 1985 [JP] Japan .................................. 60-71431

[51] Int. Cl.4 .............................................. B60N 1/04
[52] U.S. Cl. ................................. 297/379; 292/341.17
[58] Field of Search .......................... 297/378, 379, 238; 296/65 R, 65 A, 63; 292/210, 341.17

[56] References Cited

U.S. PATENT DOCUMENTS

| | | | |
|---|---|---|---|
| 2,809,064 | 10/1957 | Dlugatch | 292/210 X |
| 4,216,986 | 8/1980 | McNinch et al. | 292/341.17 |
| 4,475,763 | 10/1984 | Hamatani et al. | 297/378 X |
| 4,561,694 | 12/1985 | Mouri et al. | 297/379 |

FOREIGN PATENT DOCUMENTS

| | | | |
|---|---|---|---|
| 1171730 | 11/1969 | United Kingdom | 297/378 |
| 1421912 | 1/1976 | United Kingdom | 297/379 |

*Primary Examiner*—Peter A. Aschenbrenner
*Attorney, Agent, or Firm*—Schwartz, Jeffery, Schwaab, Mack, Blumenthal & Evans

[57] ABSTRACT

A rear seat back arresting device is arranged for arresting a rear seat back which is forward-inclinable to communicate a passenger room with a trank room through an opening. The arresting device includes an engaging device for holding the rear seat back to the stand-up position, releasing device provided in the passenger room for releasing the hold of said engaging device, and locking device provided in the trank room for locking the engaging device such that the forward inclining of the rear seat back is prevented even if the releasing device is operated.

2 Claims, 14 Drawing Figures

ARRESTING DEVICE FOR REAR SEAT BACK

BACKGROUND OF THE INVENTION

1. Field of the Invention

The present invention relates to an arresting device for a rear seat back which allows the seat back to be folded forward to correct the passenger room with the trunk room (to be called trunk-through hereafter).

2. Description of the Prior Art

An example of a presently available arresting device for rear seat backs with trunk-through is shown in FIGS. 1 and 2. (Refer Japanese Utility Model Publications No. 7296/1982, 147128/1982).

As shown in FIG. 1, rear seat 1 includes a seat cusion 2 and a seat back assembly 3. The seat back assembly 3 includes a gate shaped side component 4, and seat back members 5, 6 separated to the left and right and enclosed by the side member 4. Since the seat back members 5 and 6 are the same as each other, the operation of only one of them will be explained here. A rear side 5a of the seat back member 5 is provided with a retainer 7. An opening of the retainer 7 is an inserting opening 10 for a first striker 9 which is fixed to the chassis 8. And inside of the opening 10, a locking device 11 is placed. This locking device 11 comprises a base frame 12 which is fixed to the frame of the seat back component 5, and a lock lever 15 which is supported at a shaft 13 of the base frame 12 and is energized with the spring 14 towards a direction for engaging the striker 9. A strap 17 is provided to the elongated part 16 of the lock lever 15 as a releasing means for releasing the engagement of the lock lever. An enclosed space is formed by an engaging part 18 of the lock lever 15 with a notch 19 of the base frame 12.

However, such a prior art arresting device for rear seat backs with trunk-through is unsatisfactory in the cases where access to the truck room is undersirable when the car is parked with the passenger room door open, or when the door lock is damaged, or when the car is lent to third party and the car key is temporarily handed over because the locking lever 15 can be easily turned by drawing out the strap 17 from the passenger room and access can be made to the trunk room inside from the trunk-through by folding down the rear seat back towards the forward side.

SUMMARY OF THE INVENTION

An object of the present invention is to provide an arresting device for rear seat backs which can not be inclined forward unless the locking device inside the trunk room is operated after the trunk is opened by the trunk lid key.

Another object of the present invention is to provide an arresting device of the rear seat back in which locking device for locking the arrest of the rear seat backs provided in the trunk room for the arresting device.

According to the present invention, these objects are accomplished by an arresting device for rear seat backs comprising an engaging device for holding the rear seat back into the stand-up position, a releasing device provided in the passenger room for releasing the hold of said engaging device, and a locking device provided in the trunk room for locking the engaging device such that the forward inclining of the rear seat back is prevented even if the passenger room releasing device is operated.

DESCRIPTION OF THE PREFERRED EMBODIMENTS

Figure 1:
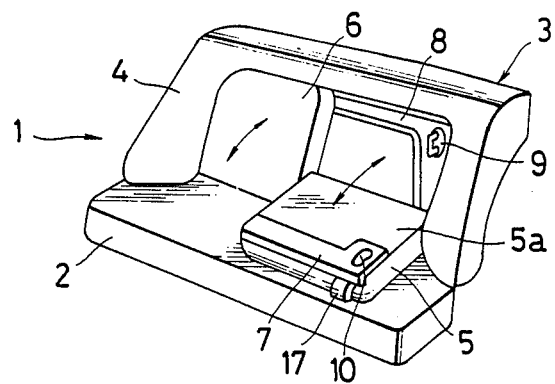
FIG. 1 is a perspective view of the prior art rear seat.
Figure 2:
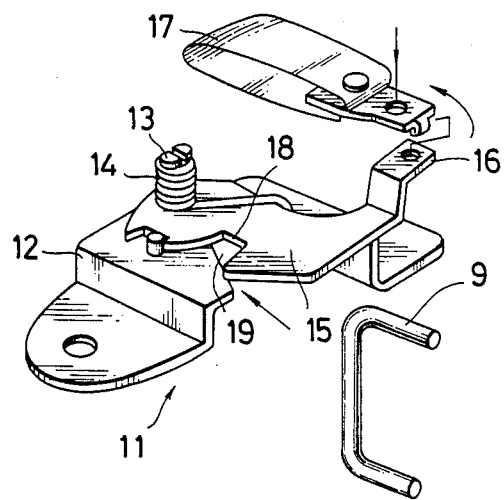
FIG. 2 is a perspective view of the prior art arresting device.
Figure 3:
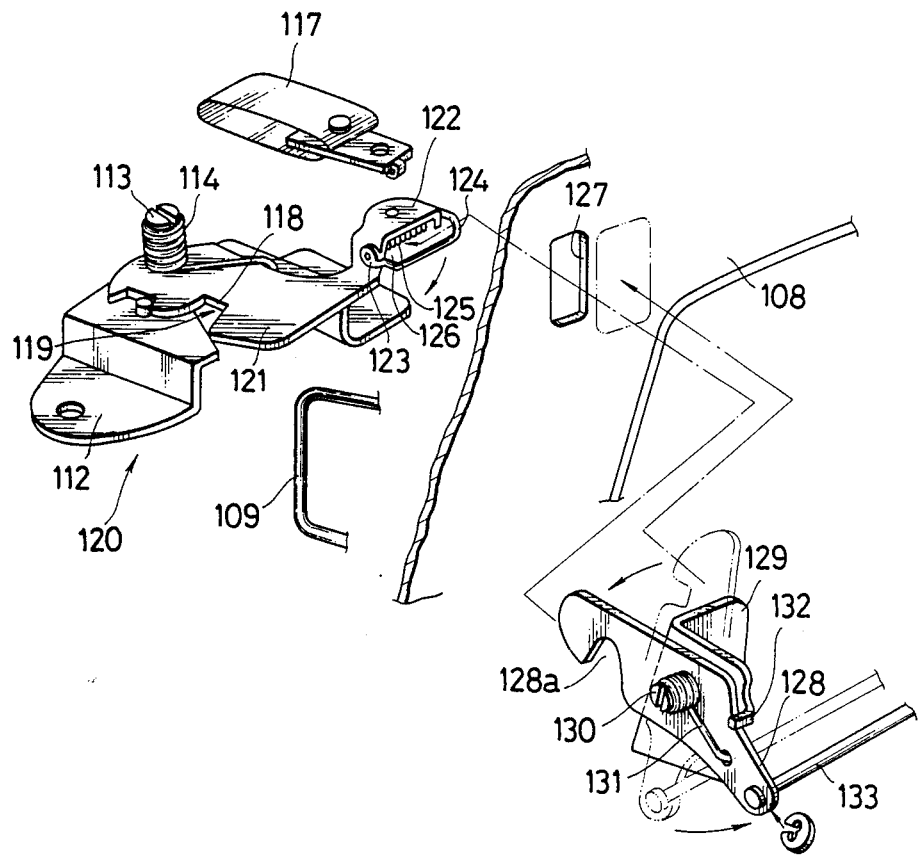
FIG. 3 is a perspective view of an arresting device for rear seat backs embodying the present invention.
Figure 4:
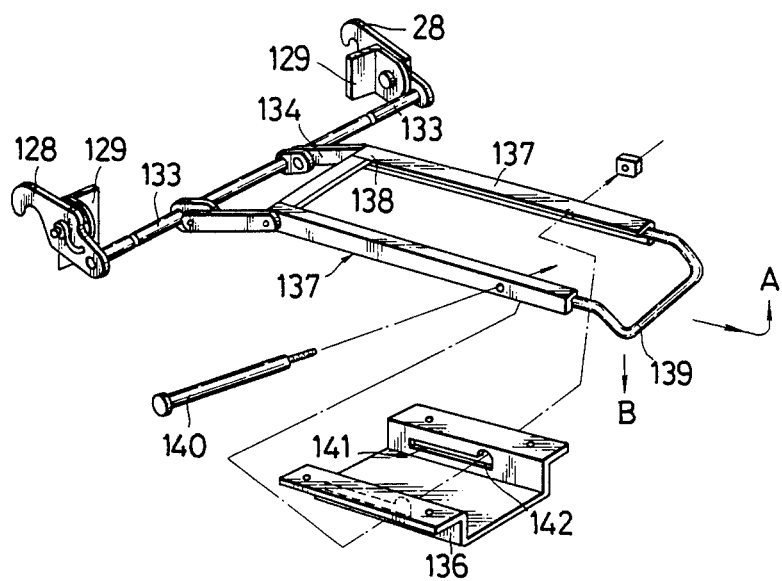
FIG. 4 is a perspective view of a locking device of the arresting device shown in FIG. 3.
Figure 5:
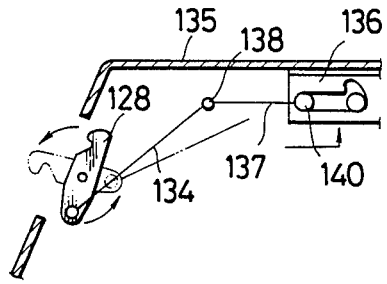
FIG. 5 is a explanatory drawing of the locking device shown in FIG. 4.

Referring to FIGS. 3 to 5, there is shown an arresting device embodying the present invention designated by reference numerical 100. In these embodiments, explanation of the portions which are the similar in operation with that of the prior art device shown in FIGS. 1 and 2 has been omitted here.

The arresting device 100 comprises an engaging device 102 and a locking device 104 for locking the engaging device 102. The engaging device 102 has the same construction as the prior art device in FIG. 2. The locking device 104 includes a second striker 124 which is axially supported via a pin 123 at an extended part 122 of a lock lever 121. A spring 125 is coiled around the pin 123 and the spring 125 is energized to press the second striker 124 against the stopper 126. A hole 127 is provided on the chassis 108 through which a lock plate 128 passes, for allowing engagement/disengagement of its notched part 128a with the second striker 124. The lock plate 128 is axially supported by a center pin 130 of a lock base frame 129, which is fixed to a car body, to rotate freely in the vertical direction and is energized by a spring 131 to press against a stopper 132. The left and right locking plates 128 are coupled by a coupling rod 133. A intervening member 134 is axially supported by the coupling rod 133 to rotate freely. A transmission member 137 is axially supported to the end of the intervening member 134 to rotate freely, and the end of the transmission component 137 forms a handle 139. On the other hand, the guide plate 136 is attached to a parcel shelf 135 enabling the transmission member 137 to slide its guide plate 136 in the horizontal direction. A pair of guide holes 141 are formed in the guide plate 136, and the guide bar 140 which slides through this hole 141 is installed to two transmission guide members 137. The guide holes 141 are shaped like the letter T and when the guide bar 140 enters the T shaped stoppers 142, the sliding of the transmission guide member 137 stops.

Below the operation of the first embodiment of the arresting device 100 according to the present invention is explained.

First, when the trunk lid is opened, the handle 139 is pulled in the direction of FIG. 4 and the guide bar 140 is pushed up against the stoppers 142. This results in the lock plates 128 being rotated and the notched portions 128a being hooked to the second strikers 124, as shown in FIG. 5 with solid lines and broken lines. In this condition the trunk lid is locked with the key. When this is done, the second striker 124 and the lock plate 128 remain locked even when the strap 117 of the rear seat back is pulled from the passenger room. As a result, the rear seat back can not be inclined forward and the trunk-through condition can not be achieved. Next, the trunk lid is opened and when the handle 139 is lowered towards in the direction of arrow B in FIG. 4, the lock plate 128 rises up with the energy of the spring 131 to release the lock from the second striker 124. In this condition if the releasing device, namely the strap 117, is pulled, the lock lever 121 turns and the first striker 109 is released. As a result, the rear seat back inclines forward at the same time and the passenger room and the trunk room become connected. This embodiment has the advantage of operating a multiple number of rear seat backs at the same time.

Figure 6:
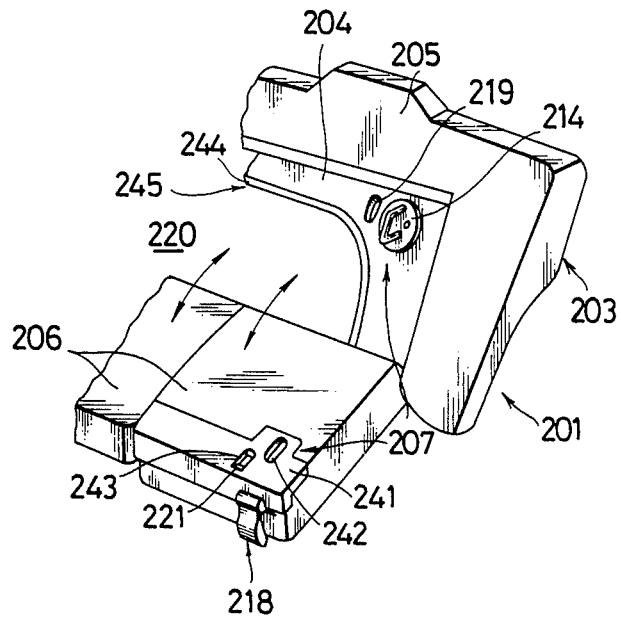
FIG. 6 is a perspective view of the rear seat back in the second embodiment of the arresting device according to the present invention.
Figure 7:
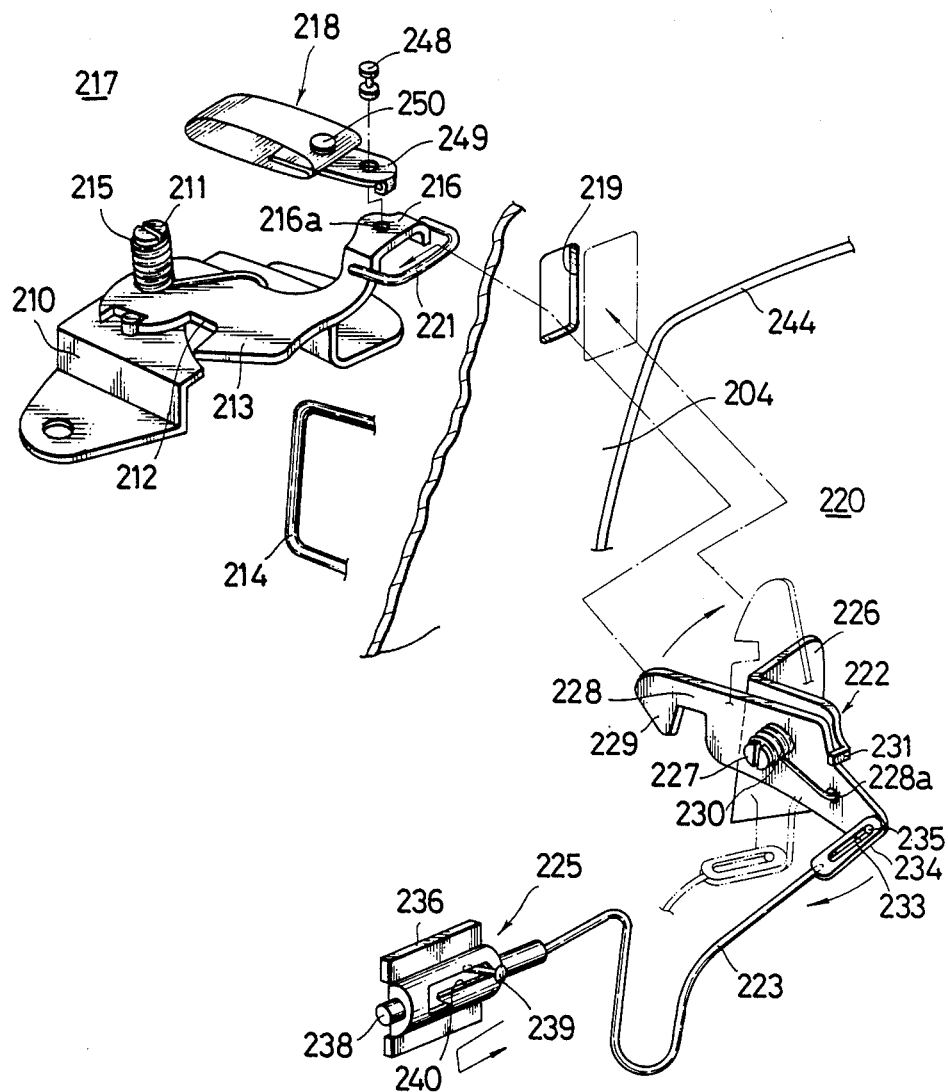
FIG. 7 is a perspective view of the arresting device of the second embodiment.
Figure 8:
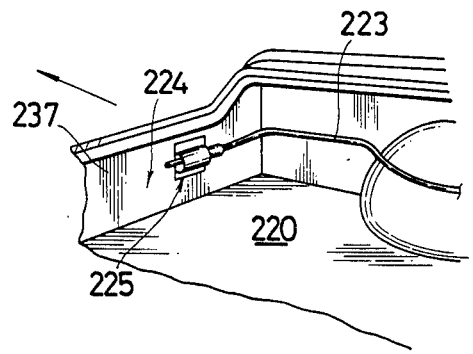
FIG. 8 is a perspective view of the trunk room in the second embodiment.
Figure 9:
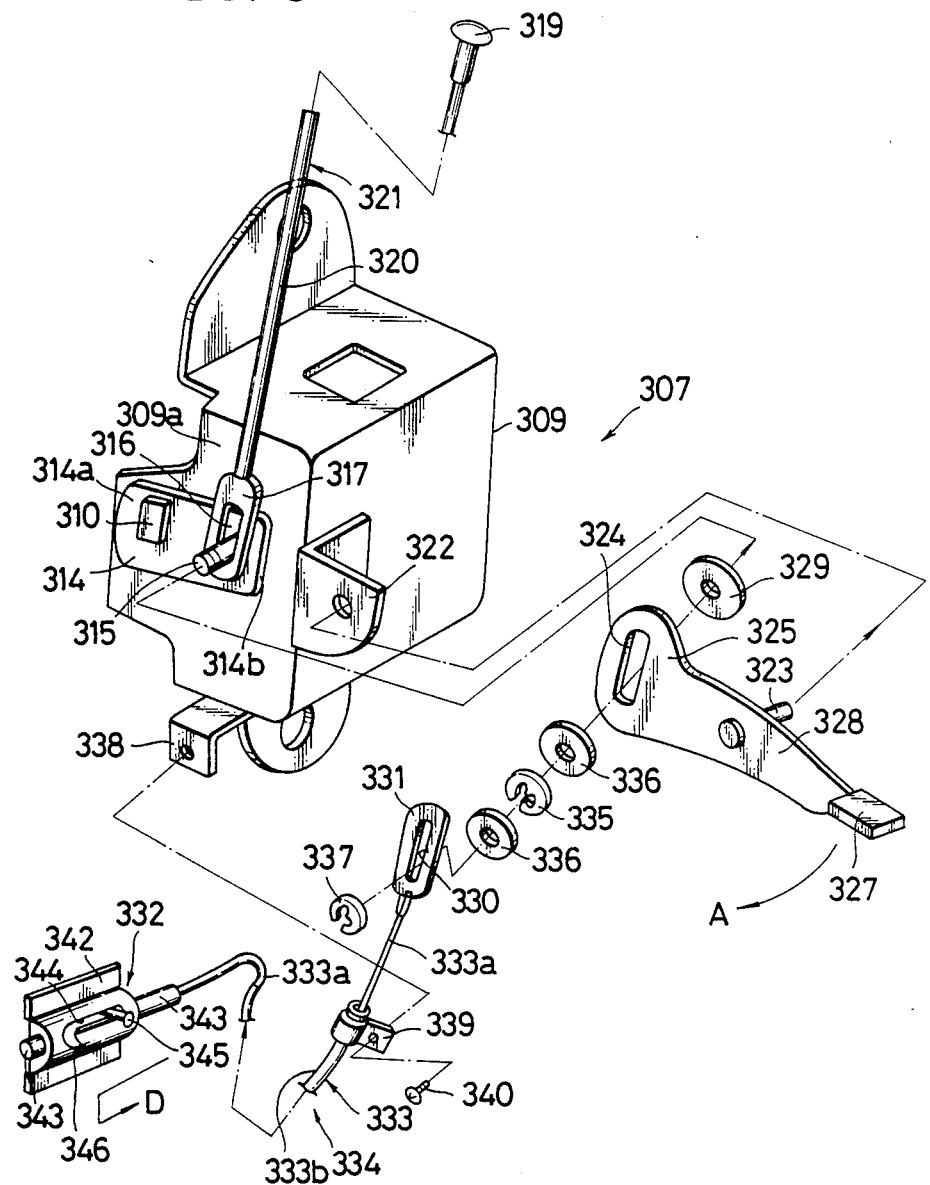
FIG. 9 is a explanatory perspective view of the third embodiment of the arresting device.

Referring to FIGS. 6 to 8, the second embodiment of the arresting device according to the present invention is shown with reference numerical 200.

In this embodiment, a rear seat 201 comprises a frame member 205 fixed to a brace 204, and rear seat backs 206 which are enclosed by the frame member 205 and axially supported to incline forward freely from their stand-up position on the brace 204. Due to the arresting device 200, the rear seat back 206 is maintained at its stand-up position on the brace 204. The arresting device 200 includes a base frame 210 which is fixed on the upper part of the rear seat back 206 of the rear seat 203 and a shaft 211 installed on the base frame 210 to turn freely. A lock lever 213 is axially supported by the shaft 211 and a spring 215 energizes the lock lever 213 towards the locking direction to lock a first striker 214 which is fixed on the brace 204. A elongated part 216 elongated from the lock lever 213 has a strap 218 which is projected towards the passenger room 217 for enabling the lock lever 213 to be energized towards the lock releasing direction, a second striker 221 which projects into a trunk room 220 through a penetration hole 219 of the brace 204, a lock lever 222 placed on the brace 204 facing the trunk room 220 to lock/release the second striker 221, and an operating device 225 provided in the vicinity of an opening 224 of the trunk room 220 and which is connected to the lock lever 222 by a flexible wire 223 as shown in FIG. 8. The lock lever 222 comprises a lock base frame 226 with an L shape cross section fixed to the brace 204, a center pin 227 projecting from the side of the frame 226, a lock plate 228 which is axially supported by the center pin 227 to turn freely up and down, and a spring 230 which is coiled around the center pin 227 and supported at a penetration hole 228a of the lock plate 228, for energizing a claw 229 of the lock plate 228 to the second striker 221. A stopper 231 is projected from the lock base frame 226 to regulate the rotation of the lock plate 228. One end of the flexible wire 223 has a plate 234 with a hole 233 and the other end of the wire 223 is fixed to the operating device 225. The hole 233 of the plate 234 engages a pin 235 of the lock plate 228. The operating device 225 comprises a guide case 236 provided on a rear end panel 237, a slide pin 238 connected with the flexible wire 223, an operating layer 239 projecting from the slide pin 238, and a notched portion 240 which enables sliding and locking of the lock lever 239.

A retainer plate 241 is provided on the rear seat back 206 to cover the base frame 210 and to have a penetration hole 242 for insertion and engagement of the first striker 214 and the penetration hole 243 for the second striker 221. A welt 244 is provided along the trunk-through opening of the brace 204. The strap 218 is attached to the plate 249 which is fixed by the rivet 248 to a penetration hole 216a of the elongated part 216 of the lock lever.

After setting up the seat back 206 of the rear seat 203, when the first striker 214 is engaged to the groove 212 of the lock lever 213 and the second striker 221 is engaged to the claw 229 of the lock plate 228, the lock of the first striker 214 can not be released even if the strap 218 is pulled. Due to this reason, the seat back 206 can not be folded down forward and thereby the goods inside the trunk room can be protected.

For detaching the lock plate 228 from the second striker 221, the trunk lid lock (not shown in the figure) is released to open the trunk 220, the operating lever 239 of the operating device 225 is pulled to turn the claw 229 upwards by turning the lock plate 228 via the flexible wire 223. This enables the strap 218 to be pulled, the lock lever 213 turns with the pulling to detach the groove 212, of the lock lever 213, from the first striker 214. After this, the seat back 206 can be folded forward for the first time.

Referring to FIGS. 9 to 14, there is shown a third embodiment of the arresting device according to the present invention with reference numerical 300.

Figure 10:
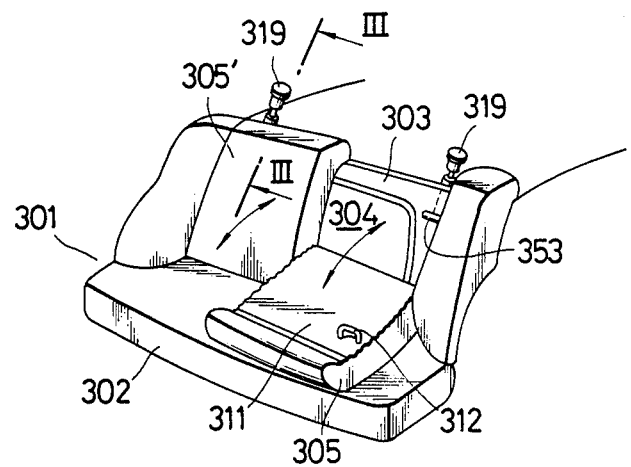
FIG. 10 is a perspective view of the rear seat in the third embodiment.
Figure 11:
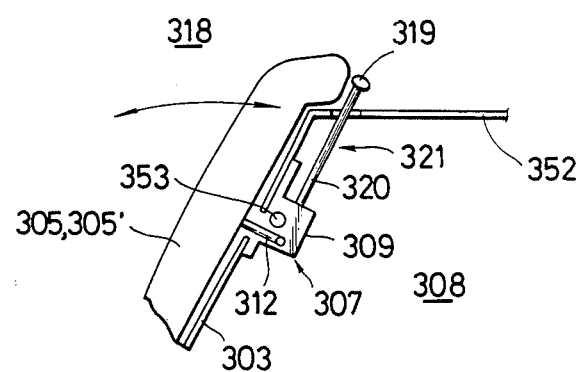
FIG. 11 is a sectional view through the line III—III in FIG. 10.
Figure 12:
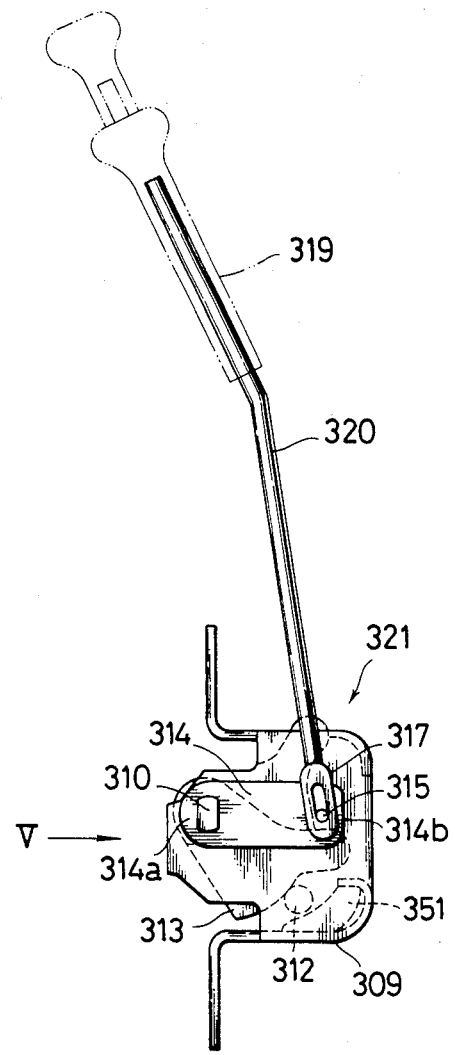
FIG. 12 is a side view of an engaging members of the arresting device in the third embodiment.
Figure 13:
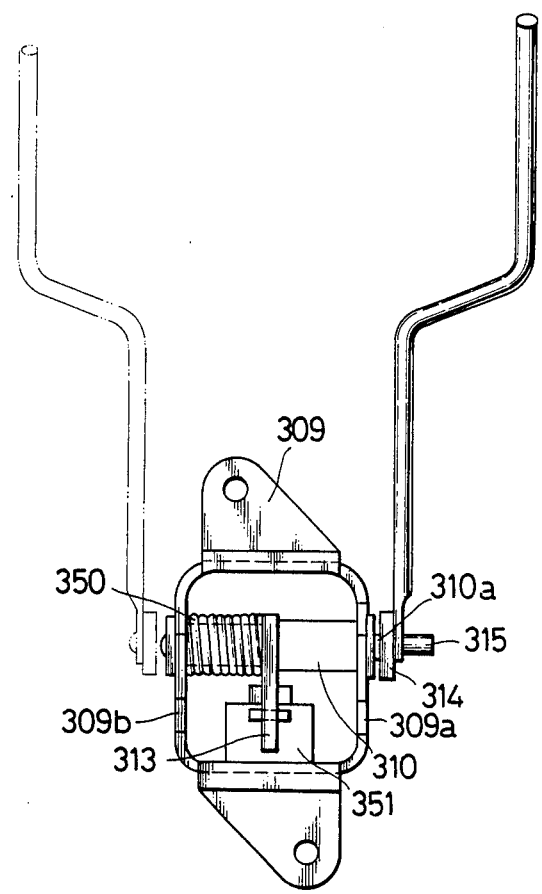
FIG. 13 is a front view of an engaging members of the arresting device in the third embodiment example.
Figure 14:
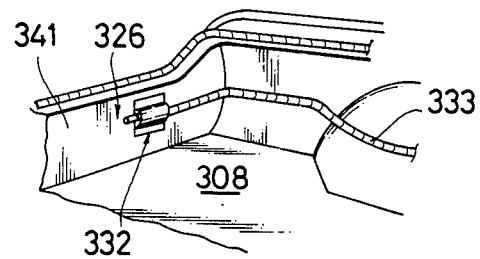
FIG. 14 is a perspective view of the trunk room inside in the third embodiment example.

As shown in FIG. 10, a rear seat 301 is supported by a seat cushion 302 fixed to a floor panel (not shown in the figure). A trunk-through opening 304 is provided to the chassis barrel brace 303. On the seat cushion 302, seat backs 305, 305' are provided to be freely inclinable forward. In FIG. 10, the left side seat back 305 is folded down forward on top of the seat cushion 302, and the right side seat back 305' is set up so as to be supported by the brace 303. The arresting device 300 has a box shaped lock base 309 fixed on the trunk room side surface of the brace 303, and a shaft 310 penetrating through both side surfaces 309a, 309b of the lock base 309.

The end 314a of a plate 314 is fixed through a pin 310 to a latch 313 which is freely engageable/releaseable to and from the striker 312 provided on the rear surface 311 of the seat backs 305, 305', so that the latch 313 can integrally rotate with the link place 314. The other end 314b is provided with a pin 315 which is inserted into an elongated opening of a first hook 317.

The upper end of the first hook 317 is provided with a first operating knob 319 which projects to the side of the passenger room 318 from the upper part of seat backs 305, 305'. The first hook 317 and the first operating knob 319 are coupled by the rod 320, constituting a first releasing/locking member 321 and the shaft 323 which can turn in the lever bracket 322 provided on the lock base 309. One end of a plate shaped second releasing/locking member 328 which has a second hook 325 with an elongated hole 324 is engaged with the pin 315 via the flat washer 329, and at the other end the second releasing/locking knob 327 is provided which extends towards the opening 326 of the trunk room 308. The second hook 325 is pivotably engaged with a lever bracket 322, so rotation of the hook 325 causes the rotation of the latch 313, as the hook 317 does. A third hook 331 with an elongated hole 330 is engaged at one side to the pin 315, and at its other side it is connected, through a flexible inner wire 333, with a lock release device 332 provided in the vicinity of opening 326 of trunk room 308. Both the third hook 331 and the lock release device 332 are configured of a third releasing-/locking member 334. E rings 335 and a flat washer 336 are put in between the second hook 325 of the second releasing/locking member 328 and the third hook 331 of the third releasing/locking member 334 via the pin 315. In addition, the E ring 337 is provided on the pin from the outer side of the third hook 331 to prevent the members, 325 and 331 from coming out and falling off from the pin 315. The inner wire 333a of the flexible wire 333 is fixed to the third hook 331 by caulking. The inner wire 333a is provided to pass through another flexible tublar wire 333b which, at an end thereof, is encircled with a brade 339, and at the other end, the outer wire is connected by a locking member 332. With a biss 340 the brade 399 is fixed to a wire blacket 338.

The locking member 332 is equipped with a guide case 342 fixed to the rear end panel 341 and a locking pin 343 confined in the case 342 but which is rotatably and axially movably. At one end the pin 343 is fixed to the inner wire. The guide case 342 is formed with a "J" shaped aperture 344 though which an operation nob 345 is projecting outward. When the nob is engaged with the curved portion 346 of the aperture 344, the inner wire is restricted to keep the LOCK-ON condition.

Around the shaft 310 a coil spring 350 is wound to urge the striker 312 to rotate in the direction of the LOCK-ON condition. On an inner side of a locking base 309 is provided a guide member 351 to cooperate with the latch 313. The striker 312 may be inserted into an opening 353 formed on the brace 303.

The operation is explained next. The third releasing-/locking member 334 is placed at the position shown in FIG. 9. That is, in its LOCK-OFF position, when the first knob 319 of first releasing/locking member 321 is pulled up in the upper direction, the pin 315 is lifted up by the elongated hole 316 via the first hook 317, the latch 313 turns towards the upper direction via the link plate 314 and the shaft 310, and therefore the striker 312 can be removed from the lock base 309 and the seat backs 305, 305' can be folded down forward.

Furthermore, by having the third releasing/locking member 334 in the LOCK-OFF position and the opening 326 of the trunk room 308 in the open position, when the second releasing/locking knob 327 of second releasing/locking member 328 is turned in the arrow direction of FIG. 7, the pin 315 is pushed up by the hole 324 of the second hook 325, the shaft 310 is turned via the link plate 314, the latch 313 is rotated towards the upper direction, and with this the condition of striker 312 becomes such that it can be removed from the lock base 309 and the seat backs 305, 305' can be folded down forward.

Next, when the operating knob 345 of the third releasing/locking member 334 is moved up to the lock 346, the third hook 331 is pulled towards the lower direction via the lock pin 343 and the inner wire 333a, and the pin 315 is prevented from shifting to the upper direction by the hole 330 of the third hook 331. Due to this reason, even if the respective first and second releasing/locking members 321, 328 are moved, the pin 315 does not move, and the latch 313 remains engaged to the inner side of striker 312 and lock base 309.

Moreover, since each of the hooks 317, 325, and 331 have their respective holes 316, 324, and 330, even when one of these 3 hooks are moved the other two do not move.

What is claimed is:

1. An engaging device for arresting the movement of a rear seat back relative to a chassis, which seat back is arranged to be forward-inclinable to communicate a passenger room with a trunk room, which are separated by said seat back, through an opening, said device comprising:
   releasable engaging means for holding the rear seat back in an engaged stand-up position, said rear seat back inclinable when released from said releasable engaging means;
   locking means for locking said releasable engaging means against release such that the rear seat back is prevented from being inclined forwardly from said engaged stand-up position; and
   operating means disposed in the trunk room for unlocking said locking means when a trunk room lid is raised, whereby only when the operating means is operated by opening a trunk room lid to unlock said locking means can the rear seat back be released by said releasable engaging means;
   said releasable engaging means comprising a first striker element fixed relative to the chassis, and a lever provided with the rear seat back, said lever engageable with the first striker;
   said locking means comprising a second striker attached to the lever of the releasable engaging means, and a lock plate connected with the chassis, said plate engageable with the second striker to hold the lever in engagement with the first striker, and said operating means comprises an operating device provided in the trunk room for controlling the engagement/disengagement of the lock plate.

2. An engaging device as claimed in claim 1, in which said locking means comprises a locking device for holding the engagement of the engaging member with the striker.

* * * * *